United States Patent

Hirschvogel et al.

[11] Patent Number: 6,033,007
[45] Date of Patent: Mar. 7, 2000

[54] FLEXIBLE CONVERTIBLE TOP OF A VEHICLE

[75] Inventors: Engelbert Hirschvogel, Hofstetten; Johann Mayer, Petershausen; Achim Rau, Aalen, all of Germany

[73] Assignee: Webasto Karosseriesysteme GmbH, Stockdorf, Germany

[21] Appl. No.: 09/015,293

[22] Filed: Jan. 29, 1998

[30] Foreign Application Priority Data

Feb. 5, 1997 [DE] Germany ............................ 197 04 173

[51] Int. Cl.[7] .................................................. B60J 7/00
[52] U.S. Cl. .................................. 296/107.11; 296/107.01
[58] Field of Search ......................... 296/107.01, 107.06, 296/107.09, 107.11, 901; 428/52, 53, 141, 12; 160/264

[56] References Cited

U.S. PATENT DOCUMENTS

| | | | |
|---|---|---|---|
| 2,708,137 | 6/1955 | Poelman | 296/107 |
| 2,765,192 | 4/1956 | Blake | 296/107 |
| 2,838,341 | 3/1958 | Watson | 296/212 |
| 3,050,334 | 1/1962 | Geiger | 296/107 |
| 3,319,995 | 5/1967 | Bohn | 296/107 |
| 4,002,367 | 1/1977 | Thomas | 296/137 |
| 4,572,570 | 2/1986 | Trucco | 296/107 |
| 4,720,133 | 1/1988 | Alexander et al. | 296/107 |
| 4,927,202 | 5/1990 | Wagner | 296/107 |
| 4,930,832 | 6/1990 | Shelton | 296/107 |
| 4,964,668 | 10/1990 | Hofmann | 296/107 |
| 5,147,713 | 9/1992 | Dalbec et al. | 428/229 |
| 5,491,021 | 2/1996 | Tolliver et al. | 428/217 |
| 5,540,476 | 7/1996 | Cowsert | 296/107 |
| 5,765,903 | 6/1998 | Essig et al. | 296/102 |

FOREIGN PATENT DOCUMENTS 40 39 888  6/1992  Germany .

*Primary Examiner*—D. Glenn Dayoan
*Assistant Examiner*—Lori L. Coletta
*Attorney, Agent, or Firm*—Sixbey, Friedman, Leedom & Ferguson; David S. Safran

[57] ABSTRACT

A flexible convertible top (1) of a vehicle with a top material (2) which has a least one layer (4) of a weldable plastic and to which at least one fixed element (5,6,7) is attached. To ensure cost-favorable and modular adjustability of a flexible convertible top, it is provided that a layer (25,26,27) of a plastic which can be directly welded to the plastic layer (4) of top material (2) is provided on at least one surface of the fixed element (5,6,7).

9 Claims, 1 Drawing Sheet

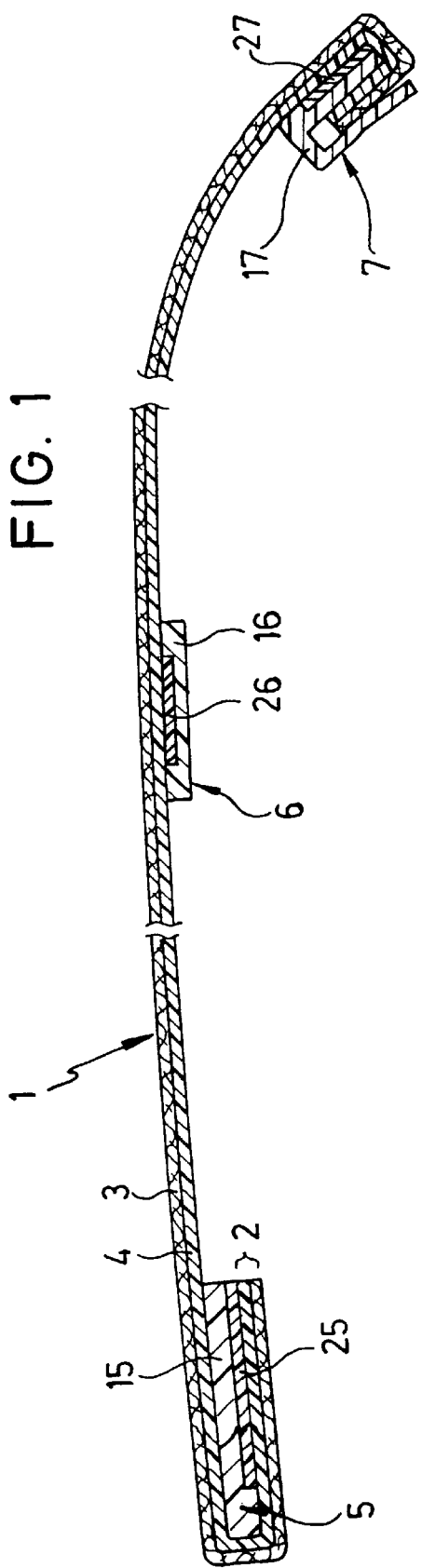
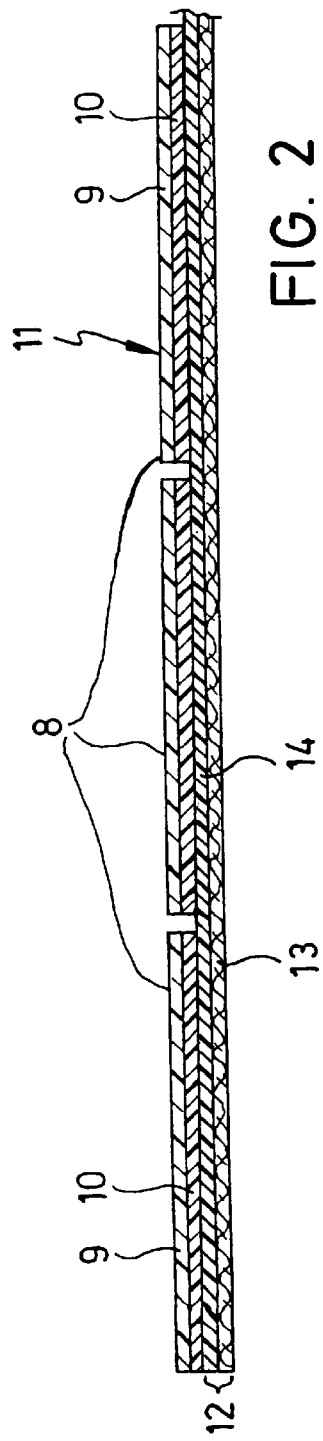

FLEXIBLE CONVERTIBLE TOP OF A VEHICLE

BACKGROUND OF THE INVENTION

1. Field of the Invention

The invention relates to a flexible convertible top of a vehicle with a top material which has at least one layer of weldable plastic and with at least one fixed element as the structural element to which the top material is attached.

2. Description of the Related Art

Flexible convertible tops of the type to which this invention is directed are used in convertible vehicles or folding roofs. Here, top materials are known which, besides a cover layer of textile support fabric, also have an inner layer of weldable plastic. Attachment of these top materials to fixed elements and hoops was done in the past either by mechanical clamping, by relatively expensive flat cementing (as in German Patent Application 40 39 888) or by inserting the fixing elements into relatively large-volume, double-walled pockets of top material.

SUMMARY OF THE INVENTION

A primary object of this invention is to devise a flexible convertible top of a vehicle which can be easily and cheaply produced.

This object is achieved, in accordance with a preferred embodiment of the invention, by the fixed element having a layer of plastic on at least one surface which can be directly welded to the plastic layer of the top material.

The design of the invention allows direct connection of the fixed element to the top material. Because the fixed elements are prepared by providing a directly weldable coating on a connection to the top material, this connection can be handled quite flexibly, both with respect to the location on the top and also with respect to the production station in the production sequence. This greatly increases the modularity of a top. Prepared fixed elements which are optionally cut to size and pre-arched for the width and roof arch of a vehicle, accordingly, can even be welded directly to the vehicle using a section of the top material matched to the length of the respective roof cutout, if necessary.

Due to the thermoplastic behavior of a weldable layer, it is advantageous if the top material is not only made of this layer, but that it is located, as is conventional, on a textile support fabric.

In this case the arrangement can be made such that the layer is located on the bottom side or the upper side of the top material and is welded to overlying, lamina-like fixed elements.

For a defined delineation of the connection area between the top material and fixed elements, it is advantageous if they have a recess for holding the weldable plastic layer.

The weldable plastic layer is produced on the fixed element, preferably, by a two-component injection molding process. Here, the base body of the respective fixed element, formed of a base material with preferably higher strength values, optionally with the insertion of carbon fibers or steel parts as reinforcement, is first injected in a mold, and then, the weldable plastic layer, as the second component, is injected directly in the same mold after withdrawing a slide on the tool mold. Fixed elements in large numbers can be economically produced using this process.

According to one embodiment of the invention, it is provided that the layer provided on the top material is made of polyvinyl chloride (PVC). For this reason, it is advantageously provided as a supplement that the weldable plastic layer on the fixed element is made of polyvinyl chloride (PVC). However, all other types of weldable thermoplastics which are joinable under the action of heat and pressure are suitable for pairing as a layer on the top material and on the fixed element. The layers are welded using one of the known plastic welding processes, such as by hot press welding, high frequency welding, infrared welding or ultrasonic welding.

These and further objects, features and advantages of the present invention will become apparent from the following description when taken in connection with the accompanying drawings which, for purposes of illustration only, show several embodiments in accordance with the present invention.

BRIEF DESCRIPTION OF THE DRAWINGS

FIG. 1 is a schematic longitudinal sectional view through a flexible top with an overlying top material; and FIG. 2 shows a cross section of a portion of a flexible top with an underlying top material and lamina-like cover bodies.

DETAILED DESCRIPTION OF THE PREFERRED EMBODIMENTS

In FIG. 1, a flexible top 1 is shown which is used either in a convertible vehicle or a vehicle with a fixed roof superstructure having a roof opening in which a folding top is inserted for opening and closing the roof opening. Top 1 is made of an outer top material 2 which, for its part, is formed of a textile support fabric 3 located on the upper side, and on the bottom thereof, a layer 4 made of a weldable plastic, for example, polyvinyl chloride (PVC).

Top material 2 is joined on its front side to a front fixed element 5, on its rear side to a rear fixed element 7, and in between, preferably, several slat-shaped, center fixed elements 6 which are used for stiffening. The fixed elements 5, 6, 7 each comprise a base body 15, 16, and 17, respectively, which preferably is formed of a high strength plastic, for example, a glass-fiber reinforced polyamide. If necessary, additional metallic stiffening parts can be embedded in base body 15, 16, 17.

Additionally, the fixed elements 5, 6, 7 have a layer 25, 26 and 27 of a plastic which can be directly welded to layer 4 of top material 2 on at least one surface. On front fixed element 5, layer 25 is injected into a recess on base body 15 that is shaped accordingly.

On middle fixed element 6, layer 26 is injected into a recess of base body 16, said recess provided on the upper side in the middle region. Rear fixed element 7 on the upper side of its base body 17 has a recess which is filled by layer 27. While above at least one surface provided with a weldable plastic layer on the fixed elements was addressed, it goes without saying that several surfaces can also be provided with this layer such that in the extreme case the base body can be completely jacketed even by a layer of this type.

Base bodies 15, 16, 17 and layers 25, 26, 27 are made preferably in a two-component injection molding process. The recesses for layers 25, 26, 27 are first closed by a slide in the mold which corresponds to the later outside contour of fixed element 5, 6, 7. After base body 15, 16, 17 of a stronger first material is injected, this slide is withdrawn and immediately afterwards layers 25, 26, 27 are injected, as a second component, into the recess which becomes exposed.

Fixed elements for flexible tops in large numbers can be economically produced in this process. Since the fixed elements are flexibly prepared by providing them with a weldable coating for a connection to the top material, flexible tops can be produced in great diversity both with respect to the final dimensions and also the location of its manufacture. The joining of layers 25, 26, 27 on fixed elements 5, 6, 7 to layer 4 on top material 2 takes place preferably by hot press welding, high frequency welding, infrared welding or ultrasonic welding. In any case, a flat connection between the top material and the fixed element takes place without any auxiliary material, for example, cement. In this way, this top can be produced much more economically.

In a second embodiment as shown in FIG. 2, the flexible top 11 is comprised of a top material 12 has an underlying textile support fabric 13 and a layer 14 of weldable plastic located thereon. The fixed elements are made in the manner of laminae 8, which are arranged at a relatively small distance behind one another on the upper side of top 11 and are welded directly to layer 14 via the weldable plastic layer 10 that is provided on the flat bottom of its base body 9. The second embodiment thus enables extremely economical production of a lamina roof. This top 11, that with the corresponding lateral guidance of the laminae 8, has high stiffness and can be stowed in an extremely small space by merging the laminae, for example, folded one on top of another in the rear part of the vehicle, the top material 12 serving as a flexible joint and seal.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We claim:

1. Flexible convertible top for a vehicle comprising a top material which has a least one slat-shaped layer of a weldable plastic and at least one fixed element to which top material is attached; wherein at least one surface of the fixed element has a layer of a plastic which is directly welded to the layer of weldable plastic of the top material.

2. Flexible convertible top as claimed in claim 1, wherein the layer of weldable plastic of the top material is located on a bottom side of the top material under a textile support fabric.

3. Flexible convertible top as claimed in claim 1, wherein the at least one fixed element has a recess for holding the layer of plastic.

4. Flexible convertible top as claimed in claim 3, wherein the layer of plastic is an injection molded-on part of the at least one fixed element.

5. Flexible convertible top as claimed in claim 1, wherein the at least one slat-shaped layer of weldable plastic on the top material is made of polyvinyl chloride (PVC).

6. Flexible convertible top as claimed in claim 5, wherein the layer of plastic of the at least one fixed element is made of polyvinyl chloride (PVC).

7. Flexible convertible top as claimed in claim 1, wherein the weld between the layers is a weld produced by one of hot press welding, high frequency welding, infrared welding and ultrasonic welding.

8. Flexible convertible top as claimed in claim 1, wherein an upper side of the top material has the layer of weldable plastic thereon, to which the plastic layer of said at least one fixed element is directly welded.

9. Flexible convertible top as claimed in claim 1, wherein the layer of plastic of the at least one fixed element is made of polyvinyl chloride (PVC).

* * * * *